US010393251B2

(12) United States Patent
Sheen

(10) Patent No.: US 10,393,251 B2
(45) Date of Patent: Aug. 27, 2019

(54) GEAR TOOTH CROWNING ARRANGEMENT

(71) Applicant: Eaton Corporation, Cleveland, OH (US)

(72) Inventor: Benjamin S. Sheen, Schoolcraft, MI (US)

(73) Assignee: Eaton Corporation, Cleveland, OH (US)

( * ) Notice: Subject to any disclaimer, the term of this patent is extended or adjusted under 35 U.S.C. 154(b) by 148 days.

(21) Appl. No.: 15/477,535

(22) Filed: Apr. 3, 2017

(65) Prior Publication Data

US 2017/0204957 A1   Jul. 20, 2017

Related U.S. Application Data

(63) Continuation of application No. PCT/US2015/049411, filed on Sep. 10, 2015.
(Continued)

(51) Int. Cl.
| *F16H 1/28* | (2006.01) |
| *F16H 55/08* | (2006.01) |
| *F16H 1/08* | (2006.01) |
| *F16H 48/285* | (2012.01) |
| *B23F 19/10* | (2006.01) |

(Continued)

(52) U.S. Cl.
CPC ............. *F16H 55/08* (2013.01); *B23F 19/10* (2013.01); *F16H 1/08* (2013.01); *F16H 48/285* (2013.01); *B23F 19/00* (2013.01); *F16H 1/28* (2013.01); *F16H 48/38* (2013.01)

(58) Field of Classification Search
CPC ........ F16H 55/08; F16H 48/285; F16H 48/38; F16H 1/28; B23F 19/10; B23F 19/00
See application file for complete search history.

(56) References Cited

U.S. PATENT DOCUMENTS 3,206,997 A     9/1965  Alexander
4,777,838 A *  10/1988  Aarestad ............... F16H 57/041
                                                   384/121

(Continued)

FOREIGN PATENT DOCUMENTS

CA        2118399 A1     9/1994
DE    102010046941 A1     3/2012

(Continued)

OTHER PUBLICATIONS

International Search Report and Written Opinion for International Application No. PCT/US2015/049411 dated Dec. 10, 2015, 14 pages.

(Continued)

*Primary Examiner* — David J Hlavka
(74) *Attorney, Agent, or Firm* — RMCK Law Group PLC

(57) ABSTRACT

A parallel axis gear configuration constructed in accordance to one example of the present disclosure can include a first gear having a first gear tooth that includes a lead crowning across a face width thereof. The lead crowning can include (i) a first lead crown defined from a centerline to a transition point and (ii) a second lead crown defined from the transition point to a first end point. The lead crowning can include a drop-off magnitude that is greater at the second lead crown than the first lead crown.

16 Claims, 7 Drawing Sheets

Related U.S. Application Data

(60) Provisional application No. 62/096,009, filed on Dec. 23, 2014, provisional application No. 62/058,785, filed on Oct. 2, 2014, provisional application No. 62/216,685, filed on Sep. 10, 2015.

(51) Int. Cl.
*B23F 19/00* (2006.01)
*F16H 48/38* (2012.01)

(56) References Cited

U.S. PATENT DOCUMENTS

| | | | |
|---|---|---|---|
| 5,620,389 A | 4/1997 | Sato | |
| 5,728,024 A * | 3/1998 | Ishizuka | F16H 48/285 475/252 |
| 5,728,025 A * | 3/1998 | Ishikawa | F16H 48/285 475/252 |
| 5,785,624 A * | 7/1998 | Mayr | F16H 48/285 475/248 |
| 6,080,076 A * | 6/2000 | Kwoka | F16H 48/285 475/160 |
| 2003/0109355 A1 | 6/2003 | Allen et al. | |
| 2009/0215576 A1* | 8/2009 | Nishiji | F16H 48/285 475/252 |

FOREIGN PATENT DOCUMENTS

| | | |
|---|---|---|
| GB | 741376 A | 11/1955 |
| GB | 1460934 A | 1/1977 |
| WO | 2013140217 A1 | 9/2013 |

OTHER PUBLICATIONS

European Search Report for EP Application No. 15846508.8 dated Sep. 28, 2018, 10 pages.

Chinese Office Action for CN Application No. 201510640806.1 dated Apr. 3, 2019 with translation, 15 pages.

\* cited by examiner

GEAR TOOTH CROWNING ARRANGEMENT

CROSS-REFERENCE TO RELATED APPLICATIONS

This application is a continuation of International Application No. PCT/US2015/049411 filed on Sep. 10, 2015, which claims the benefit of U.S. Provisional Patent Application No. 62/058,785 filed on Oct. 2, 2014, U.S. Provisional Patent Application No. 62/096,009 filed on Dec. 23, 2014 and U.S. Provisional Patent Application No. 62/216,685 filed on Sep. 10, 2015. The disclosures of the above applications are incorporated herein by reference.

FIELD

The present disclosure relates generally to parallel-axis gears and more specifically, to a gear crowning arrangement.

BACKGROUND

Gear trains that require torque sharing among multiple pinions may be found in the automotive industry such as in differentials and transmissions. Limited-slip differentials which use parallel-axis gearing rely on gear meshing events, and the friction thereof, to create the desired friction and torque bias. Gear alignment however is loosely controlled by the fit and clearance involved between the housing and gears. These misalignments, when combined with the high torque loads, can cause less than optimal gear meshing events. Historically, the fluctuation within these meshing events can cause undesirable noise.

SUMMARY

A parallel axis gear configuration constructed in accordance to one example of the present disclosure can include a first gear having a first gear tooth that includes a lead crowning across a face width thereof. The lead crowning can include (i) a first lead crown defined from a centerline to a transition point and (ii) a second lead crown defined from the transition point to a first end point. The lead crowning can include a drop-off magnitude that is greater at the second lead crown than the first lead crown.

According to additional features, the parallel axis gear configuration can further include a second gear that is in meshed relationship with the first gear. The first and second gears can be helical gears. The parallel axis gear configuration can further include a parallel axis differential that houses the first and second gears. The first gear can include a chemical vapor deposit coating thereon. The chemical vapor deposit can be BALINIT® C Star coating.

A parallel axis gear configuration constructed in accordance to additional features of the present disclosure can include a first gear having a first gear tooth that includes a lead crowning across a face width thereof. The lead crowning can include (i) a first lead crown defined from a centerline to a transition point and (ii) a second lead crown defined from the transition point to a first end point. The first and second lead crowns can have distinct magnitudes across the face width.

According to additional features, the second lead crown can include a drop-off magnitude that is greater at the second lead crown than the first lead crown. In one configuration, the first lead crown is zero. The parallel axis gear configuration can further include a second gear that is in meshed relationship with the first gear. The first and second gears can be helical gears. The parallel axis gear configuration can additionally include a parallel axis differential that houses the first and second gears. The first gear can include a chemical vapor deposit coating thereon. The chemical vapor deposit can be BALINIT® C Star coating.

A parallel axis gear configuration constructed in accordance to additional features of the present disclosure can include a first gear and a second gear received in a housing in a meshed relationship. The first gear can include a first gear tooth that includes a first gear tooth lead crowning across a face width thereof. The first gear tooth lead crowning can include (i) a first lead crown defined from a centerline to a transition point and (ii) a second lead crown defined from the transition point to a first end point. The first gear tooth lead crowning includes a drop-off magnitude that is greater at the second lead crown than the first lead crown. The second gear can have a second gear tooth that includes a second gear tooth lead crowning across a face width thereof. The second gear tooth lead crowning can include (i) a first lead crown defined from a centerline to a transition point and (ii) a second lead crown defined from the transition point to a first end point. The second gear tooth lead crowning includes a drop-off magnitude that is greater at the second lead crown than the first lead crown. The second lead crowns of the respective first and second gear tooth lead crowns align with each other providing load intensities that inhibit micro-welding between the gears and the housing.

According to other features, the parallel axis differential can house the first and second gears. The first and second gears can both include a chemical vapor deposit coating thereon. The chemical vapor deposit can be BALINIT® C Star coating. The first and second gears can be helical gears. In one configuration, the first lead crown of at least one of the first and second gear tooth lead crowning is non-zero.

BRIEF DESCRIPTION OF THE DRAWINGS

The present disclosure will become more fully understood from the detailed description and the accompanying drawings, wherein.

DETAILED DESCRIPTION

Figure 1:
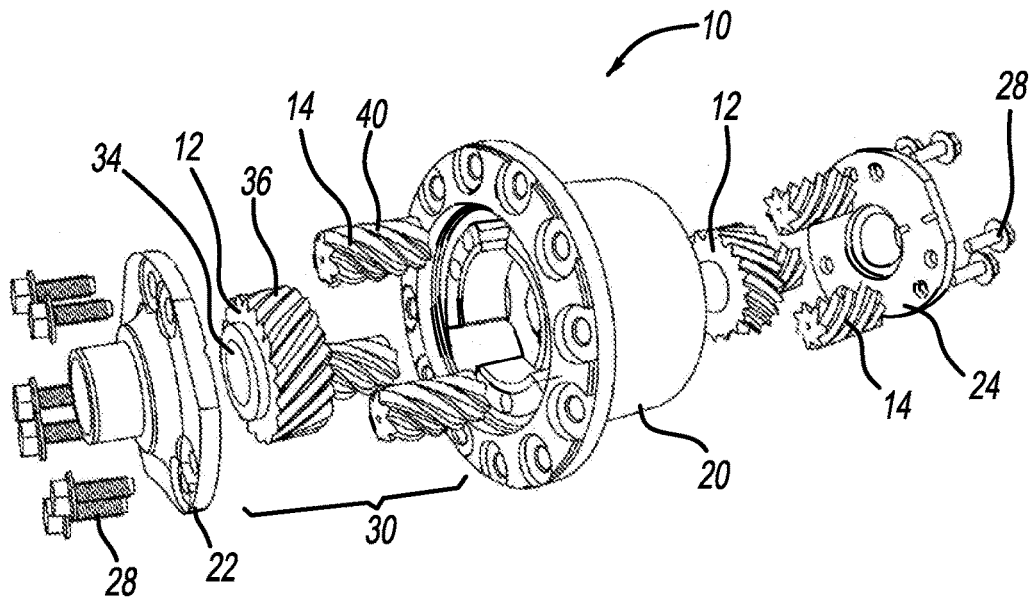
FIG. 1 is an exploded view of a parallel axis differential that can incorporate pinion gears according to one example of the present disclosure.
Figure 2:
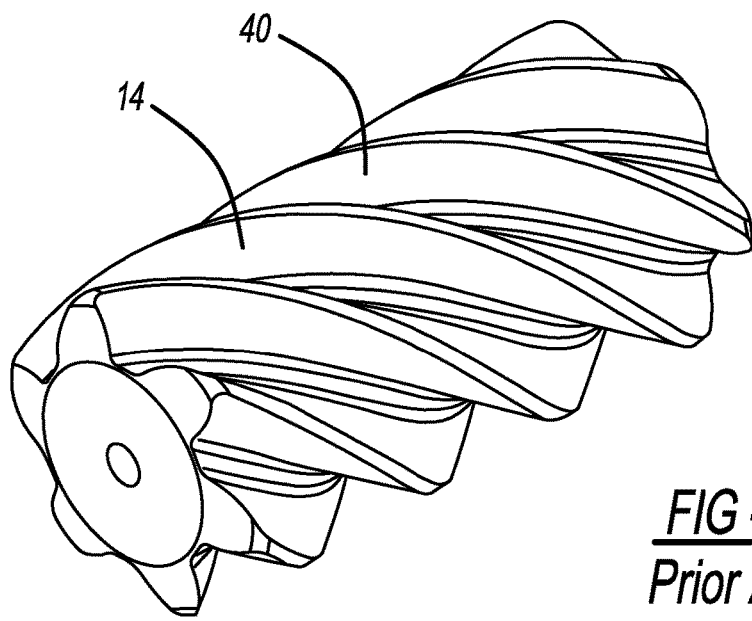
FIG. 2 is a perspective view of a pinion gear according to one example of prior art.

Reference will now be made in detail to examples of the present disclosure. It will be understood that the following examples are not intended to limit the disclosure. On the contrary, the instant disclosure is intended to cover alternatives, modifications and equivalents, which may be included within the spirit and scope of the disclosure. For example, while the following discussion is directed toward crowning of meshed pinion gears, the same principles can be applied to other meshed gears such as side gears in a differential.

With initial reference to FIGS. 1-4, a parallel axis differential constructed in accordance to one example of prior art is shown and generally identified at reference numeral 10. The parallel axis differential 10 can include one or more side gears 12, a plurality of pinion gears 14, a differential case 20, a first cover 22, a second cover 24 and a plurality of fasteners 28. The pinion gears 14 are helical pinion gears. A gear train 30 can comprise one or more side gears 12 and a plurality of pinion gears 14. During operation, the plurality of pinion gears 14 may engage the two side gears 12. The side gears 12 may transmit torque from the respective pinion gears 14 to an output such as axle shafts (not shown). Each side gear 12 may have an axis of rotation and an inner axially aligned opening 34 through which an axle shaft may connect to the side gear 12 via a splined interconnection. Both side gears 12 may comprise helical teeth 36 configured to rotatably mesh with corresponding helical teeth 40 disposed on the pinion gears 14.

Figure 3:
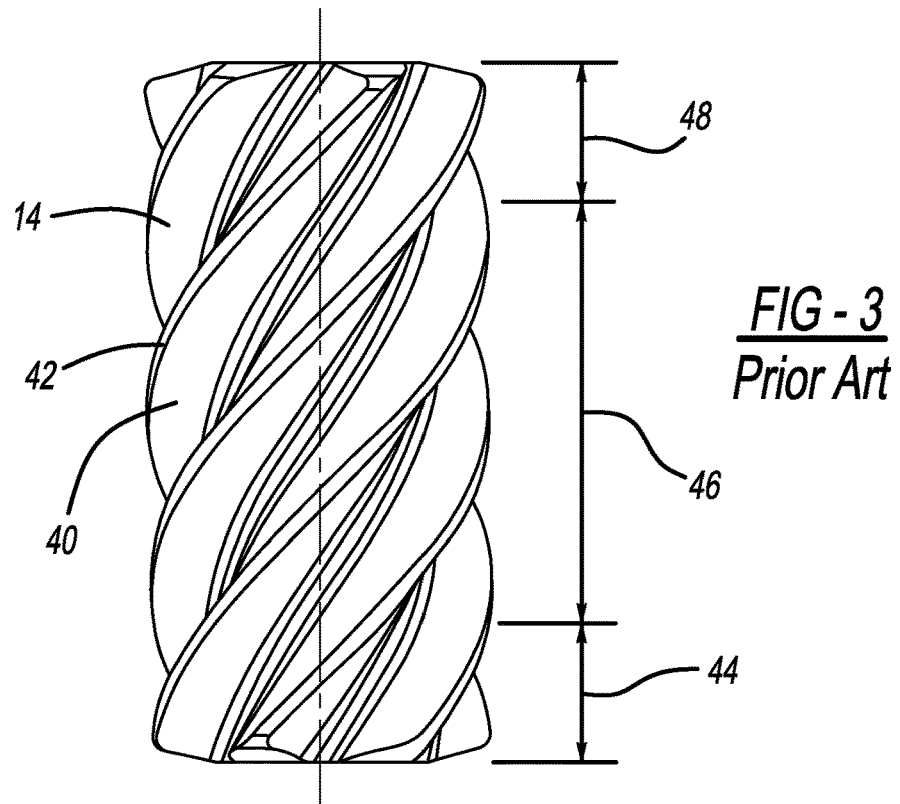
FIG. 3 is a side view of the pinion gear of FIG. 2.
Figure 4:
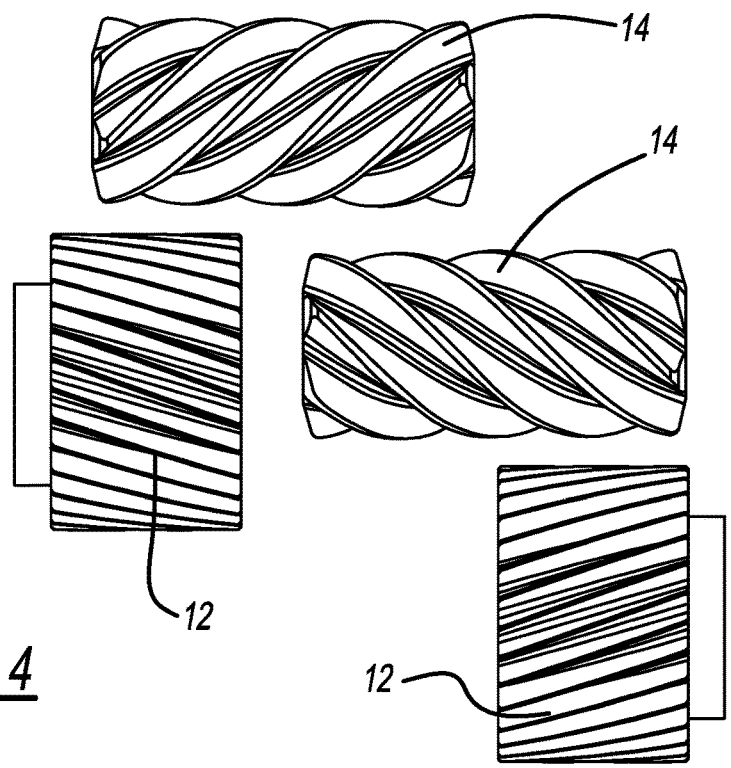
FIG. 4 is an exploded view of a first and second pinion gear and a first and second side gear used in the parallel axis differential of FIG. 1.

With specific reference to FIG. 3, the pinion gear 14 can include an axial lead 42. The pinion gear 14 can include a first zone 44, a second zone 46 and a third zone 48. The second zone 46 can be centrally located on the pinion gear 14. The first and third zones 44 and 48 can be located at opposite ends of the pinion gear 14. The pinion gear 14 includes crowning in the lengthwise direction. The average crowning amount is referred to as $C_\beta$. The average crown is defined within the second zone 46. As will become appreciated by the discussion herein, the first zone 44 and the third zone 48 on a pinion gear constructed according to the present disclosure will have a drop-off defined in length and magnitude.

Figure 5:
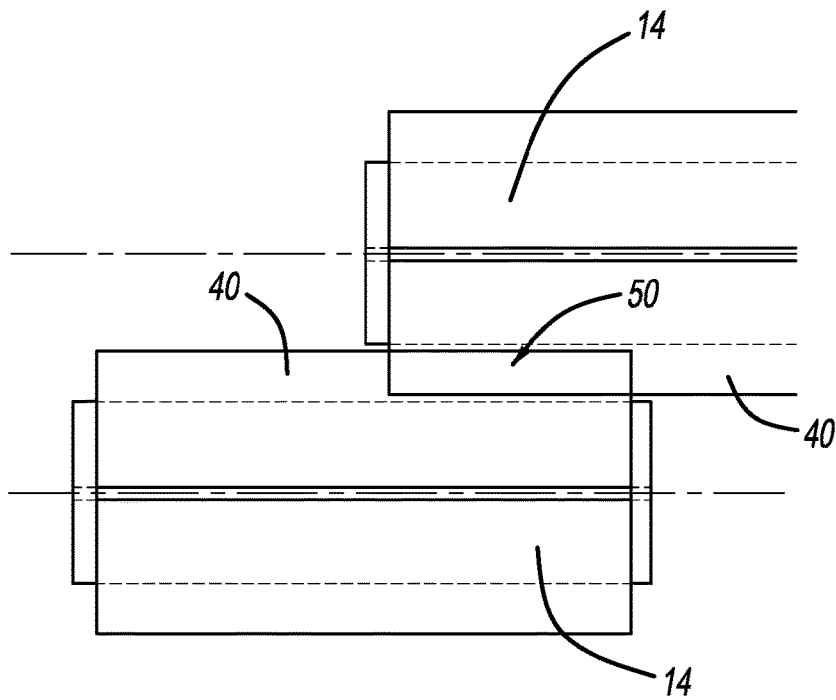
FIG. 5 is a side view of an exemplary meshing event for corresponding pinion gears according to one example of prior art.
Figure 6:
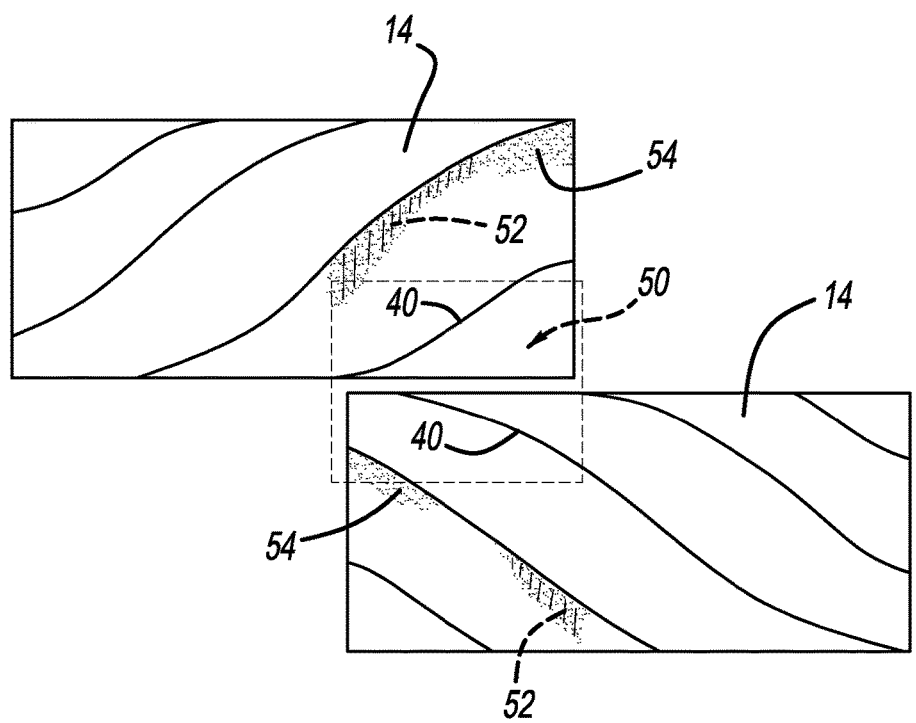
FIG. 6 is a side view of a pair of meshing pinion gears having areas of scuffing and deformation according to one example of prior art.

FIGS. 5 and 6 illustrate a pair of meshed pinion gears 14 according to prior art. The respective teeth 40 of the meshed pinion gears 14 engage at an interface area 50. In some examples, as illustrated in FIG. 6, the pinion gears 14 may develop scuffing 52 and/or plastic deformation 54 thereon during use.

As will become appreciated from the following discussion, the present disclosure is directed toward a gear tooth crowning arrangement on the pinion gears 40. The gear tooth crowning arrangement disclosed herein permits more consistent gear meshing events which reduce the noise, vibration and handling (NVH) level of the parallel axis differential 10. Moreover, the present disclosure can be shown to inhibit end-loading of the gear train 30 and compensate for any misalignments.

Figure 7:
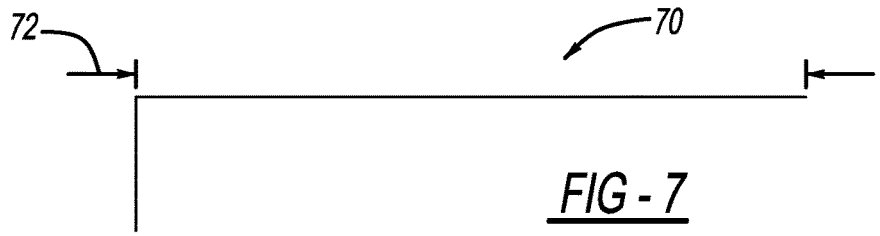
FIG. 7 is a lead inspection profile of the pinion gear of FIG. 2.

Turning now to FIG. 7, a baseline lead profile according to one example of prior art is shown and generally identified at reference 70. A face width 72 is horizontal or linear along the lead profile 70. No crowning is provided on the lead profile 70.

Figure 8:
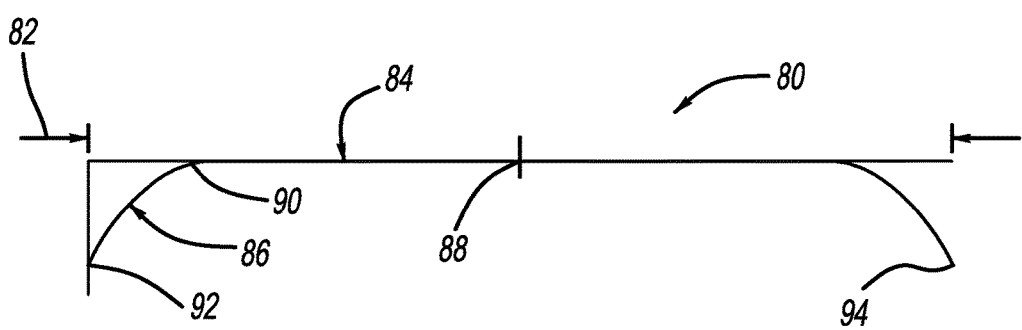
FIG. 8 is a lead inspection profile of a pinion gear having lead crowning constructed in accordance to one example of the present disclosure.

FIG. 8 illustrates a lead profile 80 having a face width 82 that includes a first lead crown 84 and a second lead crown 86 in accordance to the present teachings. The first lead crown 84 is defined from a centerline 88 to a transition point 90. The second lead crown 86 is defined from the transition point 90 to a first end point 92. In the example shown in FIG. 8, the first lead crown 84 can be zero. Explained differently, the first lead crown 84 can have no crowning. The second lead crown 86 can have a drop-off. The drop-off can correspond to an area of reduced gear teeth contact with a mating gear (having a similar lead crown drop-off). It will be appreciated in light of the disclosure that the drop-off can be located in one or both of the first and third zones 44, 48 (FIG. 3). The lead profile 80 can be similar between the centerline 88 and a second end point 94. In such a configuration, while only one end may be meshed with a corresponding pinion gear, having a similar lead crown on both ends of the pinion gear can help with assembly as the gear may be installed into the differential case 20 with either end first.

Figure 9:
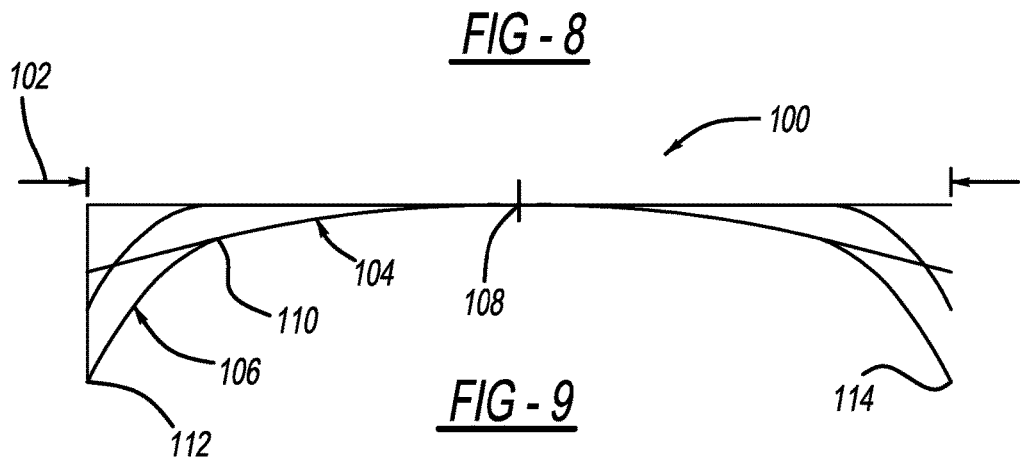
FIG. 9 is a lead inspection profile of a pinion gear having lead crowning constructed in accordance to a second example of the present disclosure.

FIG. 9 illustrates a lead profile 100 having a face width 102 that includes a first lead crown 104 and a second lead crown 106. The first lead crown 104 is defined from a centerline 108 to a transition point 110. The second lead crown 106 is defined from the transition point 110 to a first end point 112. In the example shown in FIG. 9, the first lead crown 104 can be non-zero (as compared with the first lead crown 84 shown in FIG. 8). The lead profile 100 can be similar between the centerline 108 and a second end point 114. In such a configuration, while only one end may be meshed with a corresponding pinion gear, having a similar lead crown on both ends of the pinion gear can help with assembly as the gear may be installed into the differential case 20 with either end first.

Figure 10:
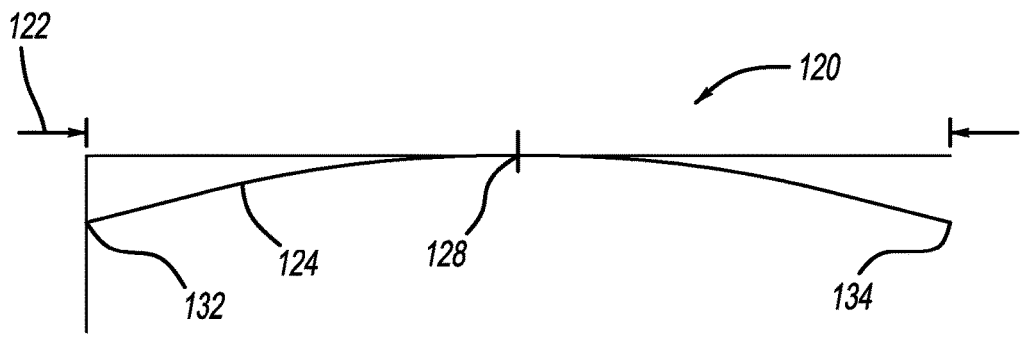
FIG. 10 is a lead inspection profile of a pinion gear having lead crowning constructed in accordance to a third example of the present disclosure.

FIG. 10 illustrates a lead profile 120 having a face width 122 that includes a first lead crown 124. The first lead crown 124 is defined from a centerline 128 to a first end point 132. In the example shown in FIG. 10, the first lead crown 124 can be non-zero (as compared with the first lead crown 84 shown in FIG. 8). In the example shown in FIG. 10, the first lead crown 124 can be continuous from the centerline 128 to the end point 132. Explained further, the first lead crown 124 can be similar to the first lead crown 104 described in FIG. 9 however, the first lead crown 124 can continue to the first end point 132 without a defined transition. The lead profile 120 can be similar between the centerline 128 and a second end point 134. In such a configuration, while only one end may be meshed with a corresponding pinion gear, having a similar lead crown on both ends of the pinion gear can help with assembly as the gear may be installed into the differential case 20 with either end first. It is appreciated however that while the lead profile 120 is shown having both ends of the pinion crowned (such as to assist with assembly), the pinion gear 14 may be constructed as having only one end with a lead crown.

Figure 11:
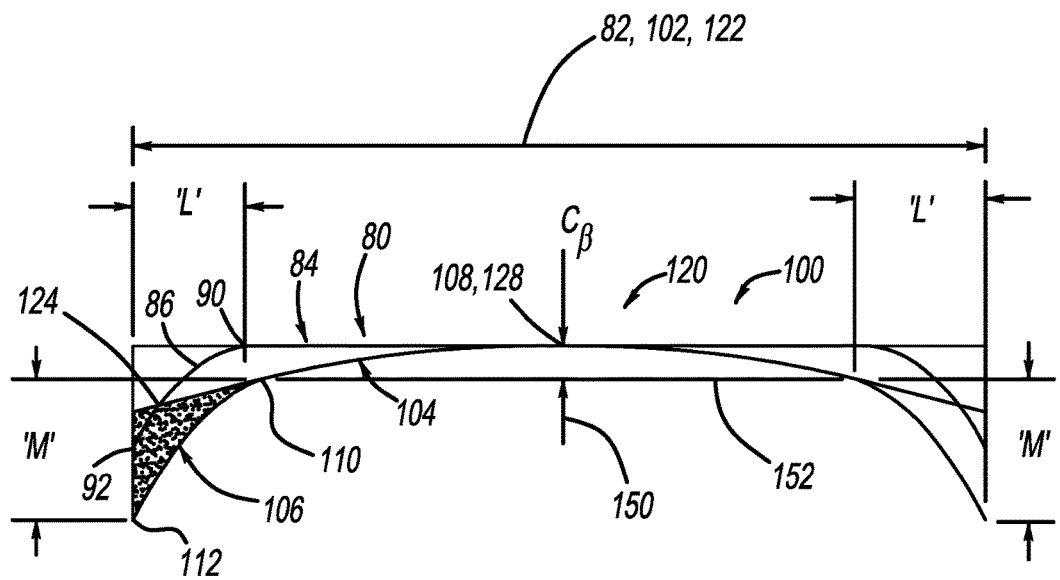
FIG. 11 is a lead inspection profile of the pinion gear shown in FIG. 9 identifying additional features according to the present disclosure.
Figure 12:
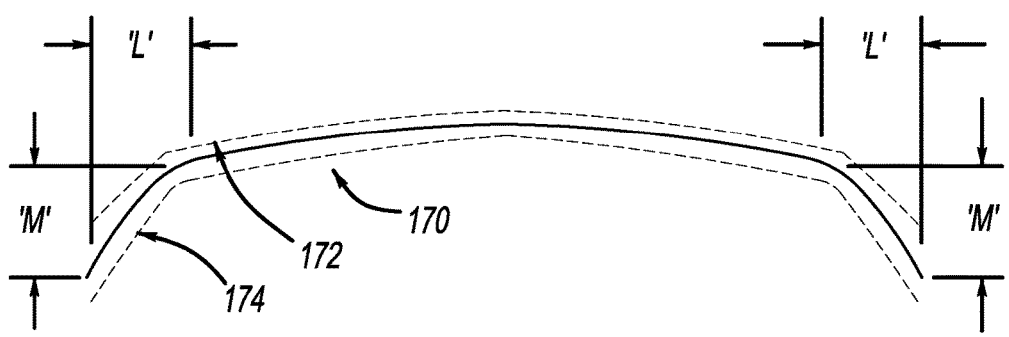
FIG. 12 is a lead inspection profile of a the pinion gear of FIG. 11 and identifying a crowning tolerance band according to one example of the present disclosure.

With reference now to FIGS. 11 and 12, additional features of the present disclosure will be described. FIG. 11 shows features of the lead profile 80 (FIG. 8), the lead profile 100 (FIG. 9) and the lead profile 120 (FIG. 10) together. A drop-off magnitude M is identified between the first lead crown 124 and the second lead crown 106. In one example, the drop-off magnitude M can be greater than a distance 150 between a foundation line 152 and a centerline 108, 128. In one example, the drop-off magnitude M can be a multiple of 1.5 greater than a distance 150. Other configurations are contemplated. A drop-off distance L is identified between the transition points 90, 110 and the first end points 92, 112. The drop-off distance L can be determined based on a given application. FIG. 12 illustrates an exemplary crowning tolerance band 170 having an upper tolerance 172 and a lower tolerance 174. The crowning tolerance band 170 identifies an area that the lead profile can occupy while still providing the reduced NVH levels in a given gear train.

Figure 13:
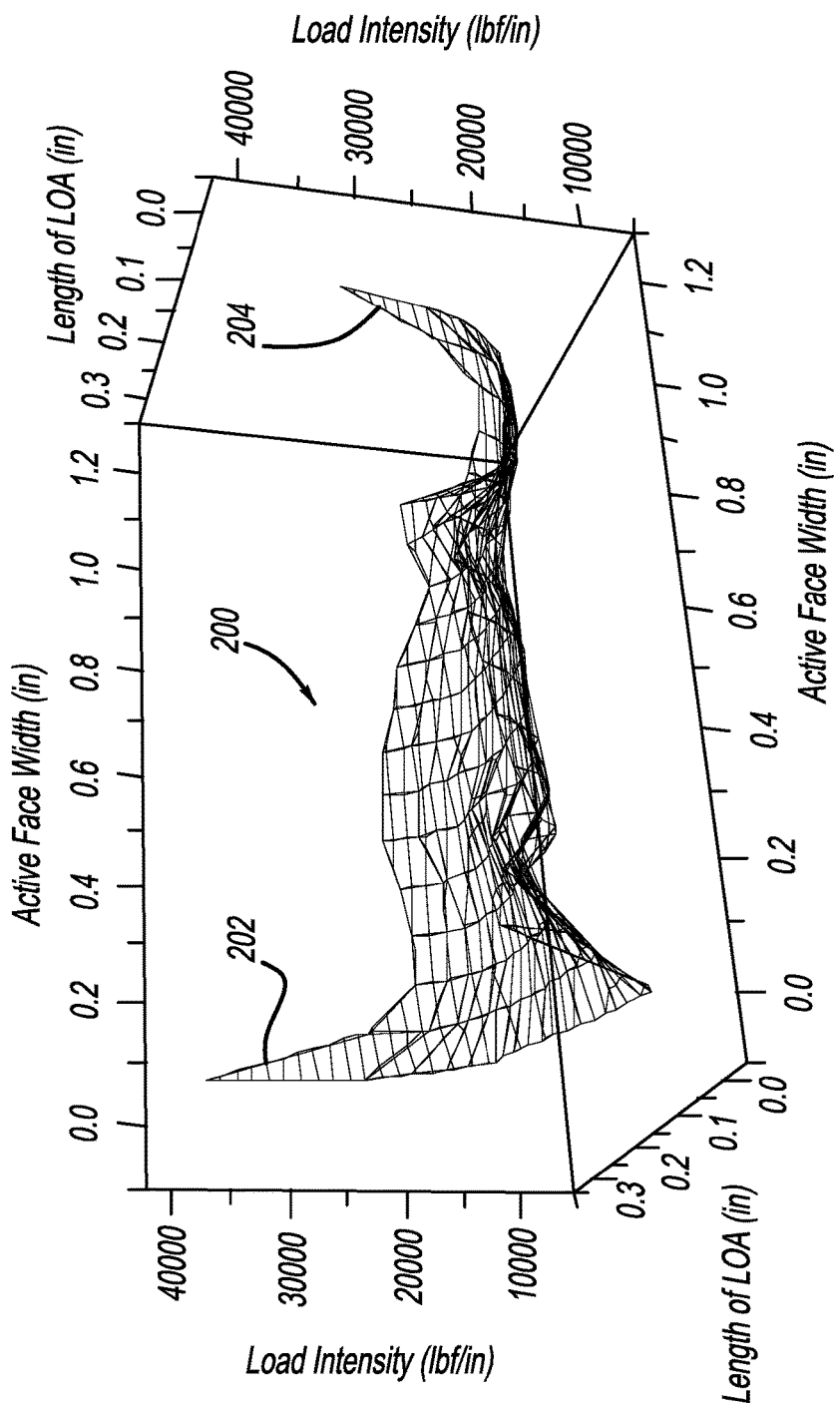
FIG. 13 is a load intensity distribution of a pair of mating pinion gears according to prior art.
Figure 14:
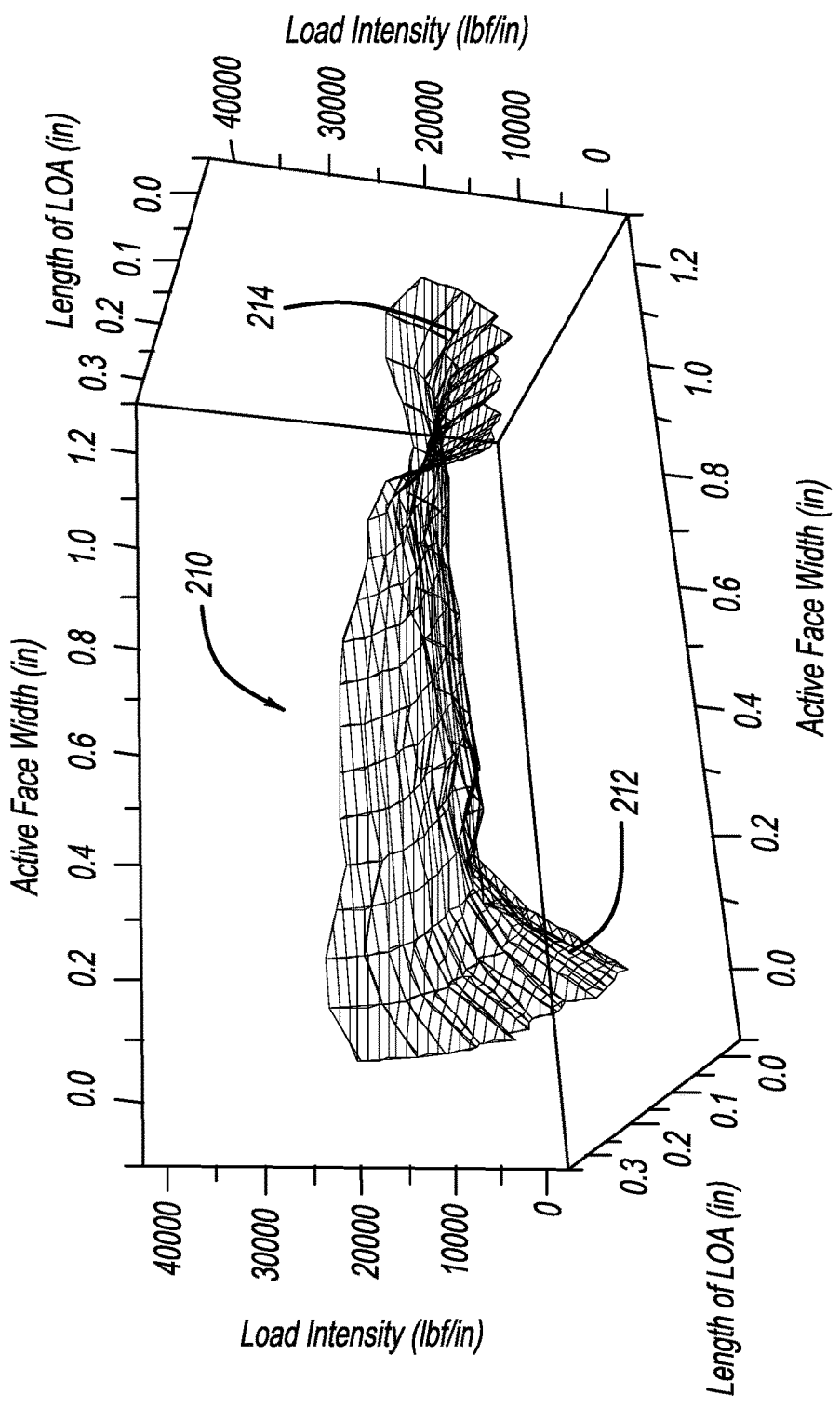
FIG. 14 is a load intensity distribution of a pair of mating pinion gears constructed in accordance to one example of the present disclosure.

FIG. 13 illustrates a load intensity distribution 200 for a pinion gear disposed in a parallel axis differential according to prior art. Notably, an active face width shows increased load intensities 202 and 204 in meshed areas consistent with a meshed interface area 50 (FIGS. 5 and 6). The increased load intensities 202 and 204 produce unfavorable NVH. FIG. 14 illustrates a load intensity distribution 210 for a pinion gear having a lead crowning according to one of the examples of the present disclosure and disposed in a parallel axis differential. Notably, an active face width shows reduced load intensities 212 and 214 in meshed areas consistent with a meshed interface area 50. The reduced load intensities 212 and 214 provide improved NVH characteristics. The reduced load intensities avoids micro-welds and subsequent breaking of those micro-welds causing NVH chatter. The micro-welds can occur in prior art examples between the pinion teeth 40 and the housing 20.

According to other examples of the present disclosure, a chemical vapor deposit coating may be additionally or alternatively applied to the pinion gears 14 that can be shown to provide improved NVH qualities. One such product is a chemical vapor deposit coating marketed by Oerlikon Balzers of Liechtenstein. One example is BALINIT® C Star coating marketed by Oerlikon Balzers. The chemical vapor deposit coating can reduce friction and/or pressure between the pinion gears 14 and the housing. In this regard, the coating can reduce the propensity of the micro-welds from forming between the pinion gears 14 and the housing 20 and the resulting stick-slip action that would otherwise cause noise. In prior art examples, high pressure, lack of sufficient lubricant, and similarity of material properties such as hardness, alloy content, and surface finish are characteristics that can encourage micro-welds. The chemical vapor deposit coating, such as identified above, separates and protects the substrate materials from contacting each other in this operating scenario. Preventing such micro-welding and adhesive wear has been shown to also improve the NVH performance of the differential. In other examples, tip relief may be added in the involute profile direction (measuring from root to tip). This further helps improve the load intensity plot in FIG. 14. Such tip relief may be produced with specially designed hob cutters.

The foregoing description of the many examples has been provided for purposes of illustration and description. It is not intended to be exhaustive or to limit the disclosure. Individual elements or features of a particular aspect are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A parallel axis gear configuration comprising:
   a first gear having a first gear tooth that includes a lead crowning across a face width thereof, the lead crowning comprising:
   a first lead crown defined from a centerline to a transition point; and
   a second lead crown defined from the transition point to a first end point; and
   wherein the lead crowning includes a drop-off magnitude that is greater at the second lead crown than the first lead crown.

2. The parallel axis gear configuration of claim 1, further comprising a second gear that is in meshed relationship with the first gear.

3. The parallel axis gear configuration of claim 2 wherein the first and second gears are helical gears.

4. The parallel axis gear configuration of claim 3, further comprising:
   a parallel axis differential that houses the first and second gears.

5. The parallel axis gear configuration of claim 1 wherein the first gear includes a chemical vapor deposit coating thereon.

6. A parallel axis gear configuration comprising:
   a first gear having a first gear tooth that includes a lead crowning across a face width thereof, the lead crowning comprising:
   a first lead crown defined from a centerline to a transition point; and
   a second lead crown defined from the transition point to a first end point; and
   wherein the first and second lead crowns have a distinct magnitudes across the face width and wherein the first gear includes a chemical vapor deposit coating thereon.

7. The parallel axis gear of claim 6 wherein the second lead crown includes a drop-off magnitude that is greater at the second lead crown than the first lead crown.

8. The parallel axis gear of claim 6 wherein the first lead crown is zero.

9. The parallel axis gear configuration of claim 6, further comprising a second gear that is in meshed relationship with the first gear.

10. The parallel axis gear configuration of claim 9 wherein the first and second gears are helical gears.

11. The parallel axis gear configuration of claim 7, further comprising:
    a parallel axis differential that houses the first and second gears.

12. A parallel axis gear configuration comprising:
    a first gear having a first gear tooth that includes a first gear tooth lead crowning across a first face width thereof, the first gear tooth lead crowning comprising:
    a first lead crown defined from a first centerline to a first transition point; and
    a second lead crown defined from the first transition point to a first end point wherein the first gear tooth lead crowning includes a first gear drop-off magnitude that is greater at the second lead crown than the first lead crown; and
    a second gear having a second gear tooth that includes a second gear tooth lead crowning across a second face width thereof, the second gear tooth lead crowing comprising:
    a first lead crown defined from a second centerline to a second transition point; and
    a second lead crown defined from the second transition point to a first end point wherein the second gear tooth lead crowning includes a second gear drop-off magnitude that is greater at the second lead crown than the first lead crown; and wherein the first and second gears are received in a housing in a meshed relationship.

13. The parallel axis gear configuration of claim 12, wherein the housing comprises:

a parallel axis differential that houses the first and second gears.

14. The parallel axis gear configuration of claim 12 wherein the first and second gears both include a chemical vapor deposit coating thereon.

15. The parallel axis gear configuration of claim 12 wherein the first and second gears are helical gears.

16. The parallel axis gear configuration of claim 12 wherein the first lead crown of at least one of the first and second gear tooth lead crowning is non-zero.

* * * * *